Dec. 11, 1956 — E. A. THOMPSON — 2,773,431
MILLING MACHINE
Filed July 23, 1951 — 9 Sheets-Sheet 1

INVENTOR:
Earl A. Thompson
BY
Barnes, Kisselle, Laughlin & Raisch
ATTORNEYS.

INVENTOR.
Earl A. Thompson

INVENTOR.
Earl A. Thompson

Dec. 11, 1956          E. A. THOMPSON          2,773,431
                        MILLING MACHINE
Filed July 23, 1951                         9 Sheets—Sheet 5

INVENTOR.
Earl A. Thompson
BY
ATTORNEYS.

INVENTOR.
Earl A. Thompson

Dec. 11, 1956   E. A. THOMPSON   2,773,431
MILLING MACHINE

Filed July 23, 1951   9 Sheets-Sheet 8

INVENTOR.
Earl A. Thompson
BY
Barnes, Kisselle, Laughlin & Raisch
ATTORNEYS.

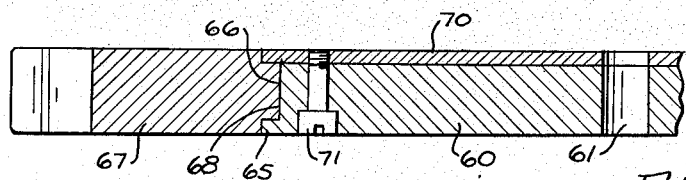
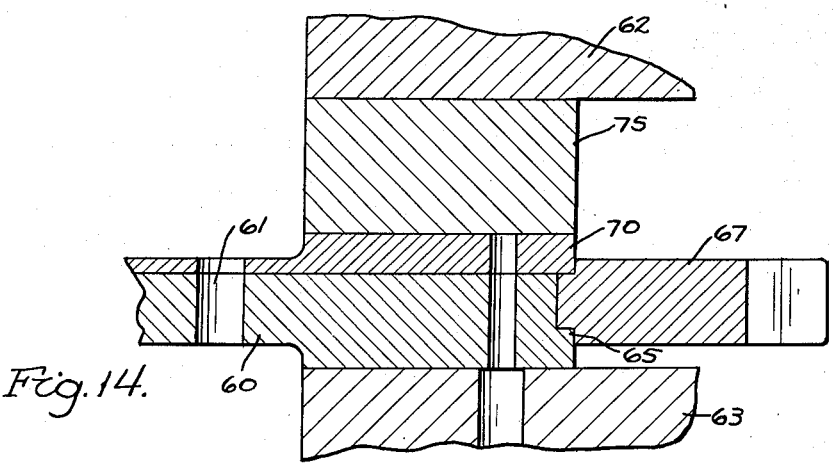
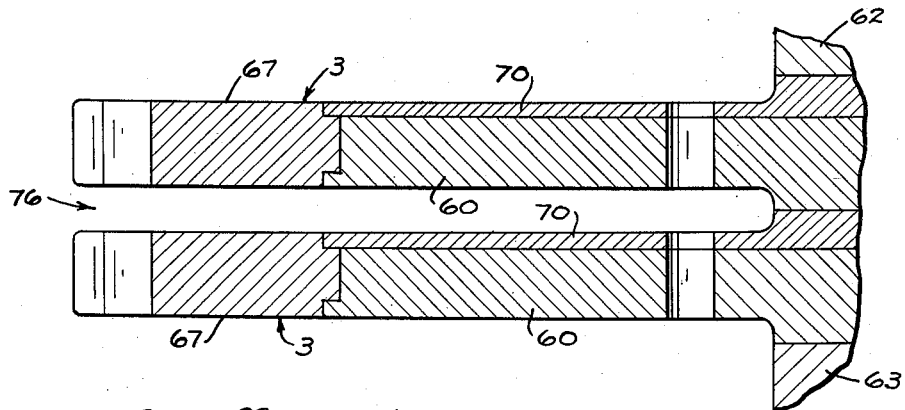
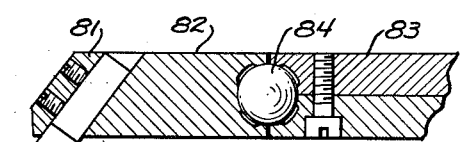

United States Patent Office 2,773,431
Patented Dec. 11, 1956

2,773,431

MILLING MACHINE

Earl A. Thompson, Ferndale, Mich.

Application July 23, 1951, Serial No. 238,050

6 Claims. (Cl. 90—18)

This invention relates to a milling machine and more particularly to a milling machine which is adapted for cutting to depths less than, equal to, and even greater than, the radius of the milling cutter.

This invention contemplates a milling machine particularly well adapted for cutting recesses or grooves which is accurate and efficient in operation.

It is an object of this invention to produce a machine adapted, e. g., for milling out the vanes of a rotor for a fluid coupling or drive from a solid block of steel wherein the milling cuts have a depth greater than the radius of the milling cutter.

Fig. 13 is a section along the line 13—13 of Fig. 10.

Fig. 14 is a section along the line 14—14 of Fig. 10.

Fig. 15 is a view similar to Fig. 13 but showing a straddle milling cutter.

Fig. 16 is a detail sectional view showing a ball bearing mounting for a finishing cutter.

Figure 4:
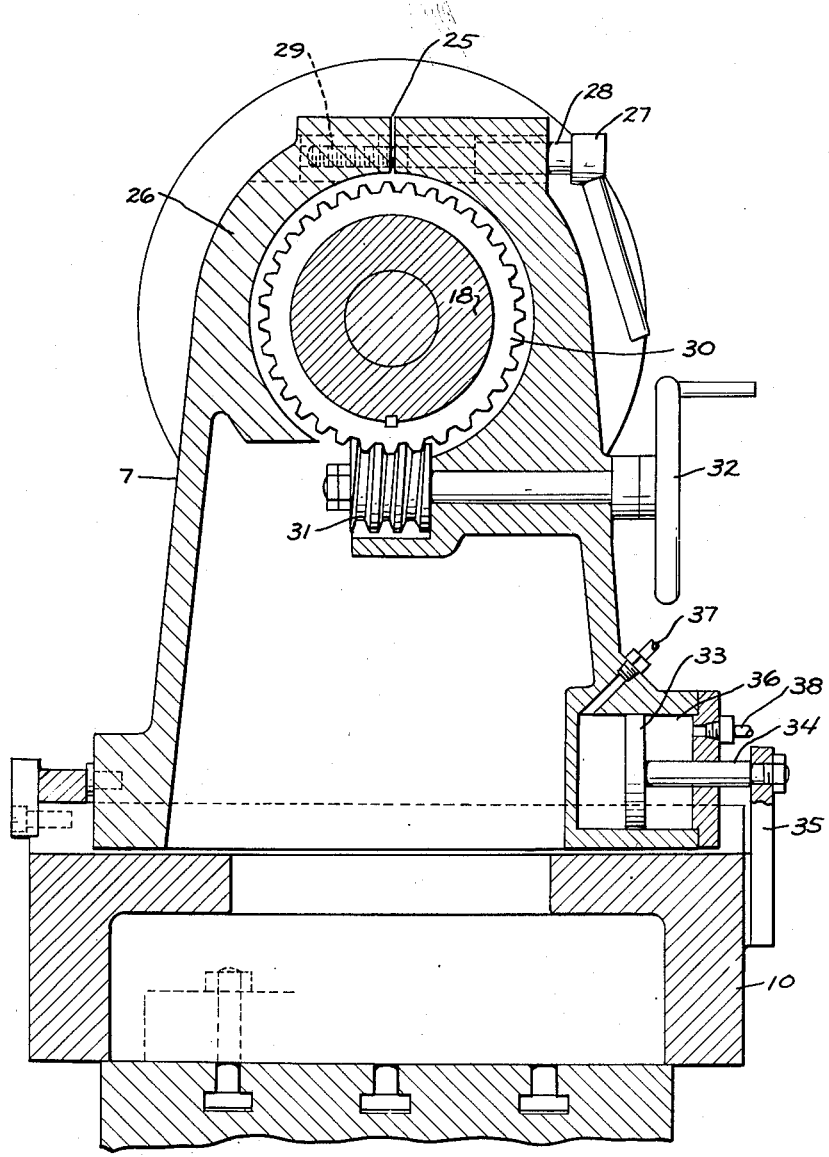
Fig. 4 is a section along the line 4—4 of Fig. 1.
Figure 7:
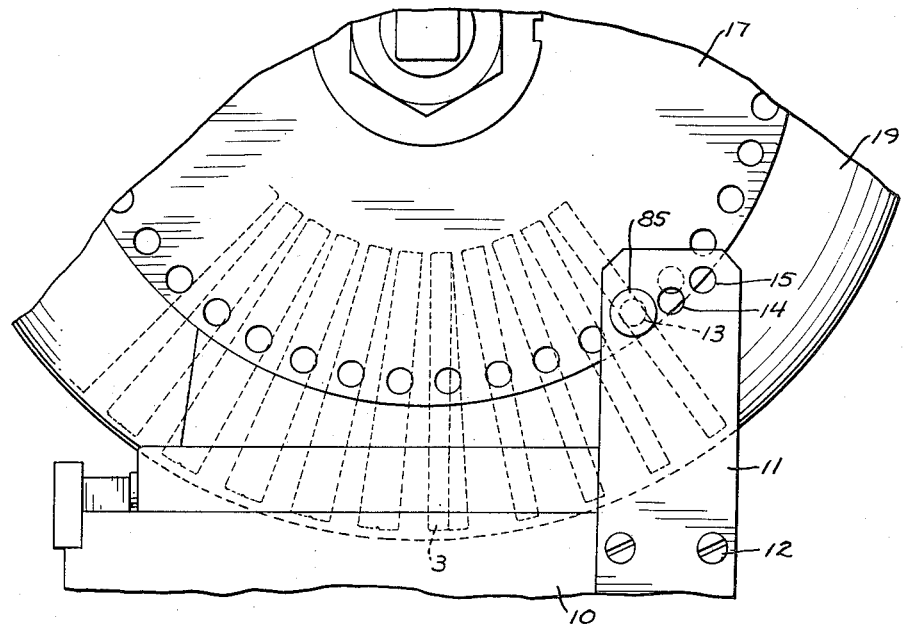
Fig. 7 is a view similar to Fig. 6 but showing the second series of cuts of a three cut system made with a single milling cutter.

Referring more particularly to the drawings the milling machine comprises a table 1 upon which is mounted the frame 2 which carries the milling cutters 3, the chip breaker 50 and the driving shaft 5. The work support head, generally designated 6, comprises a body 7 provided with a dovetail rib 8 along its bottom face by means of which the body 7 is guided in ways 9 upon base 10. Base 10 is slidably mounted upon table 1 for rectilinear movement toward and away from cutter 3. A stationary dowel plate 11 is secured to base 10 by screws 12 and is provided with three locating holes 13, 14 and 15 having their centers positioned in an arc of a circle (Fig. 7). Body 7 carries a work supporting spindle 16. The work supporting spindle 16 is telescoped within, and keyed to, cylindrical mounting member 18 (Fig. 4). Spindle 16 can move axially in sleeve 18. The upper portion of body 7 is in the form of a cylinder having a longitudinal split 25. Mounting member 18 is journalled within body 7 and is held against rotation and clamped in any of its adjusted positions by drawing the split cylindrical portion 26 of body 7 together by means of bolt 27. Bolt 27 is provided with a shoulder 28 and has a threaded end 29. By turning bolt 27 the split cylinder 26 is drawn together and clamps sleeve 18 in place. An indexing dowel plate 17 is mounted upon, and keyed to, sleeve 18. Mounting sleeve 18 supports the work 19 which, by way of example, takes the form of a cast block or steel which is to have vanes milled therein to form the rotor of a fluid coupling or drive.

Figure 1:
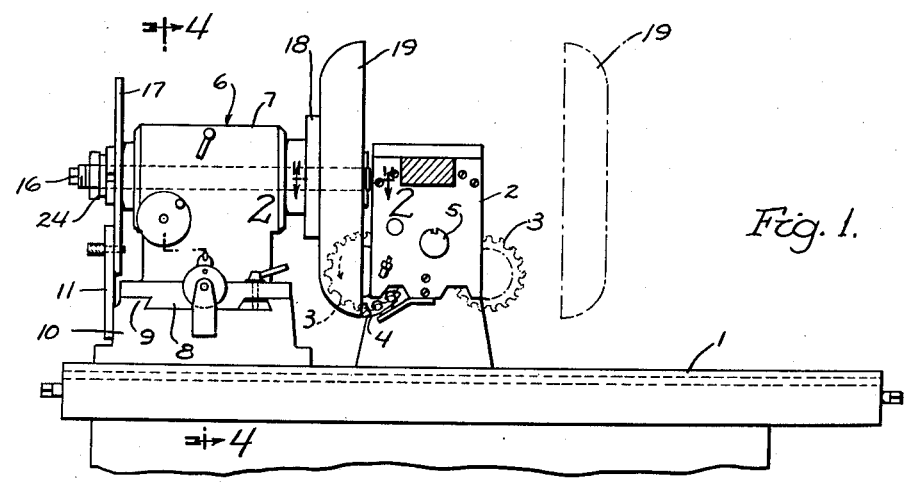
Fig. 1 is an elevation of the milling machine which is the subject of this invention and shows the rotor in the process of being milled.
Figure 2:
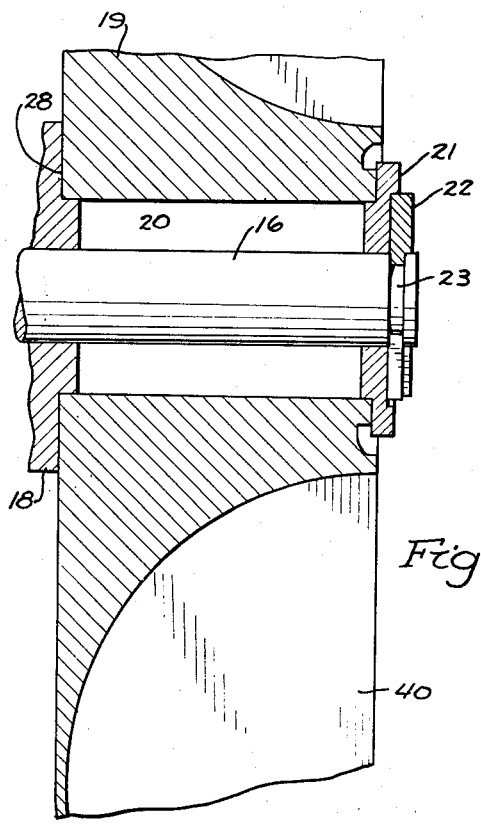
Fig. 2 is an enlarged fragmentary section along the line 2—2 of Fig. 1 showing the manner of securing the work in cutting position.
Figure 3:
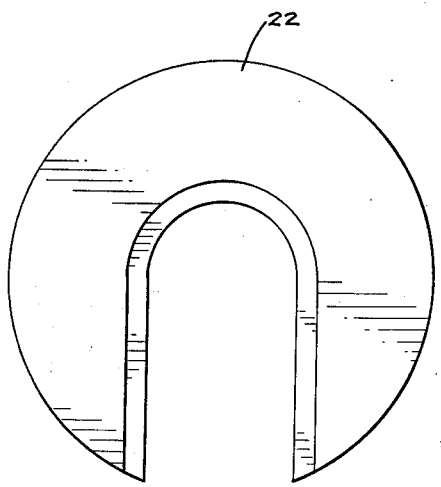
Fig. 3 is a detail of the C washer which forms part of the mechanism for securing the work on the spindle.

The mounting of the work 19 upon mounting sleeve 18 and spindle 16 is shown in Fig. 2. The work or rotor 19 is rovided with a central opening 20. A hub plate 21 is held on shaft 16 by means of a C washer 22 which interengages a circumferential groove 23 in the end of spindle 16. The hub 21 cooperates with the shouldered end 28 of mounting sleeve 18 to support the work 19. The remote end of the spindle is threaded and provided with a nut 24 which can be tightened to draw shaft 16 lengthwise of sleeve 18 so that hub 21 and mounting sleeve 18 act as a chuck or vise in which work 19 is tightly gripped so that work 19 will be indexed or rotated with spindle 16.

A worm gear 30 is keyed to sleeve 18 and meshes with a worm 31 driven by hand wheel 32 (Fig. 4). When clamping bolt 27 is released, hand wheel 32 can be turned to adjust sleeve 18 and indexing plate 17. For moving head 6 in transverse ways 9 there is provided a fixed piston 33 mounted upon a fixed piston rod 34 which is secured to bracket 35 fixed to base 10. Body 7 is provided with a cylinder 36 for piston 33. Pressure fluid lines 37 and 38 selectively apply pressure fluid to the cylinder 36 on one side or the other of piston 30 to slide head 6 in ways 9 either to the left or right as viewed in Fig. 4. Indexing plate 17 is provided with a plurality of equally spaced locating holes 39 positioned adjacent its circumference. The number of holes 39 corresponds to the number of vanes 40 which are to be formed in work 19 by milling out a corresponding number of recesses 41.

As shown, the milling machine is provided with two milling cutters 3 for milling two rotors 19 at a time. The mountings for each of the milling cutters 3 is identical so only one will be described. Each milling cutter 3 is provided with a plurality of equally spaced teeth 42. Each tooth 42 has a cutting edge or face 43 and a driving tooth face 44 which interengages or meshes with the teeth 45 of driving gear 46, Figs. 10 and 11. Driving gear 46 is fixed on shaft 47 journalled in frame 2. Gear 46 meshes with driving gear 48 keyed on driving shaft 49 which is also journalled in frame 2. Drive shaft 49 is driven in any suitable manner such as by an electric motor and reduction gear train (not shown). A chip breaker 50 is journalled upon post 51 fixed on bracket 52 secured to frame 2 by screws 53. Post 51 provides an axis about which chip breaker 50 rotates, this axis being positioned radially of the axis 54 (extended) about which milling cutter 3 rotates.

Figure 12:
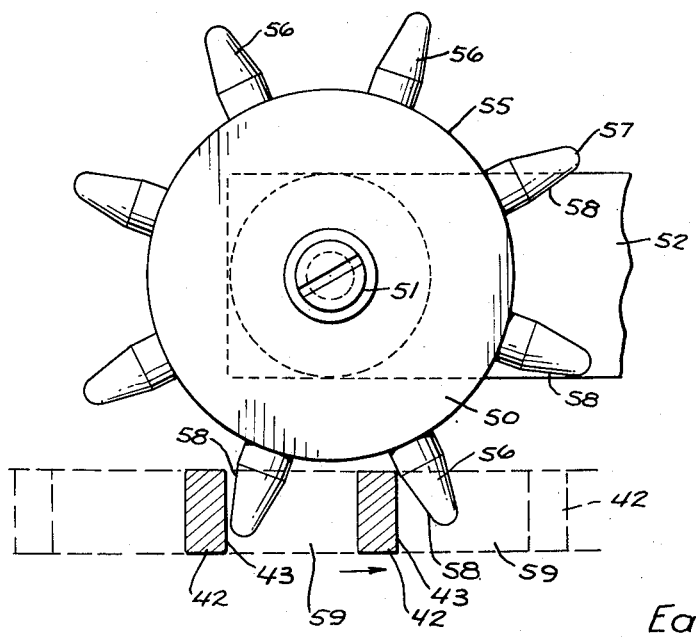
Fig. 12 is a section along the line 12—12 of Fig. 10.

Chip breaker 50 comprises a cylindrical body 55 having a plurality of radially extending fingers 56. Each finger 56 is in the form of a cone with its outer end rounded as at 57. Fingers 56 are spaced circumferentially about cylindrical body 55 so that the fingers 56 will mesh between each two succeeding teeth 42 of the milling cutter 3. Thus, by way of example, the distance between the trailing edges 58 of succeeding fingers is, as shown in Fig. 12, substantially equal to the distance between the leading cutting edges or faces 43 of succeeding milling cutter teeth 42. Chip breaker 50 is driven from, or by, milling cutter 3 by the interengagement of cutting faces 43 of the milling cutter teeth with the trailing edges of chip breaker fingers 56. Thus, during the milling or cutting operation, fingers 56 act to not only break off the cutting chips by also to dislodge these chips from the spaces 59 between succeeding milling cutter teeth 42.

Figure 10:
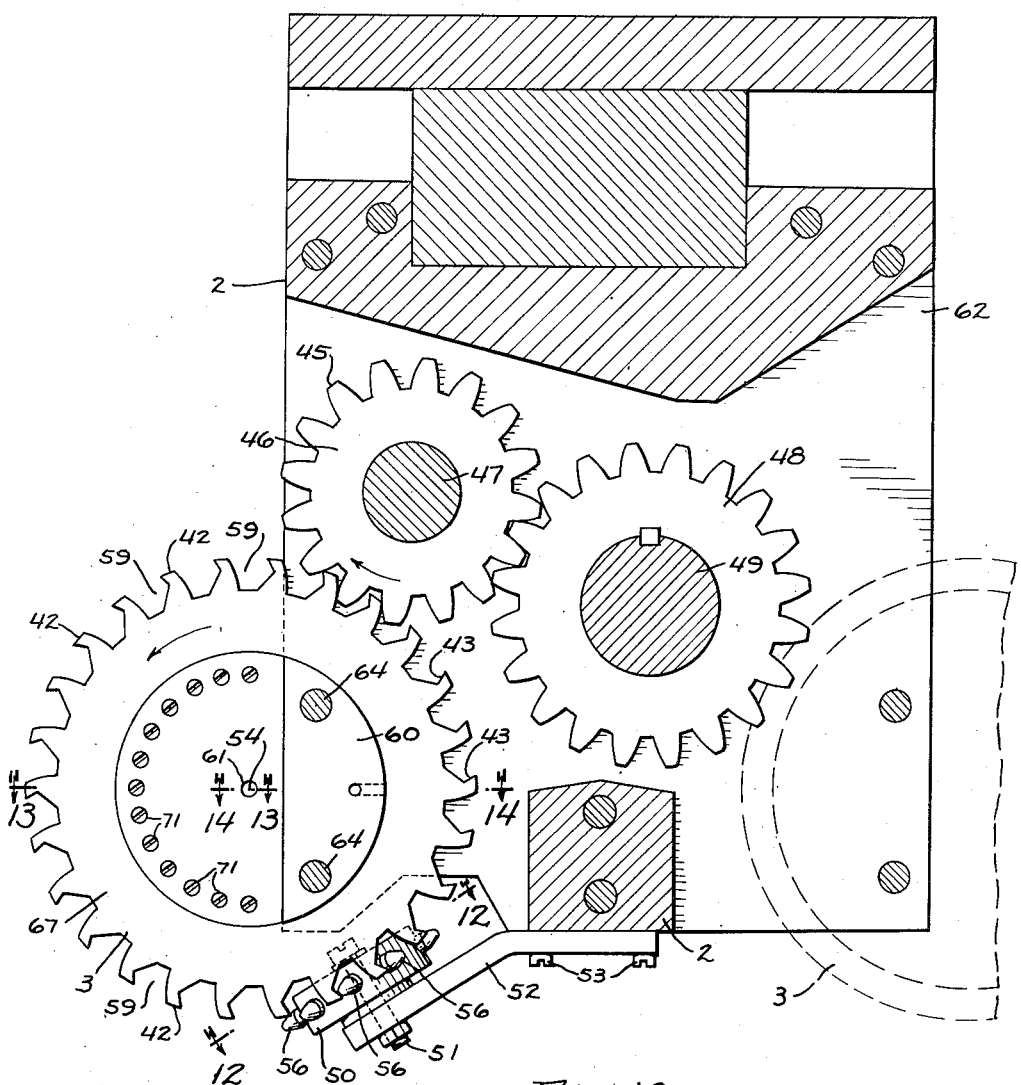
Fig. 10 is a section along the line 10—10 of Fig. 9.
Figure 11:
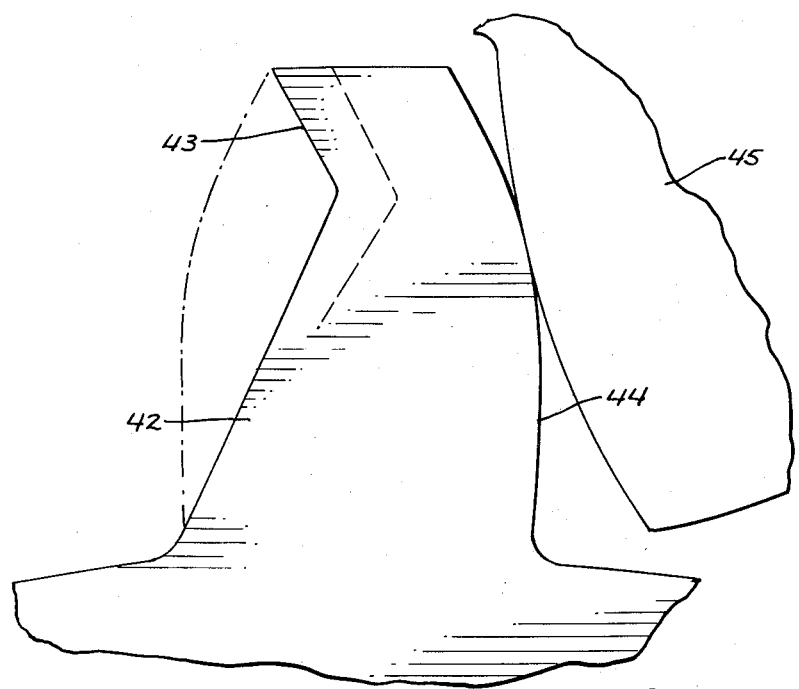
Fig. 11 is an enlarged view showing one of the cutting teeth of the milling cutter in driving relation with a tooth of the driving gear.

Each milling cutter is mounted upon a stationary hub 60 provided with an opening 61 concentric and co-axial with the axis of rotation 54 of milling cutter 3. Hub 60 is secured between rigid support plates 62 and 63 (which form a part of frame 2) by means of bolts 64 which pass through support members 62, 63, hub 60 and spacer block 75 so that hub 60 is rigidly secured to frame members 62 and 63. Hub 60 is provided with a circumferential shoulder 65 and a circumferential cylindrical bearing surface 66. Each milling cutter 3 is in the form of a circular ring 67 having an annular rib 68 along its inner circumference which acts as a bearing surface which rides upon bearing surface 66 of hub 60. The internal diameter of ring 67 is the same as the external diameter of bearing surface 66 so that ring 67 has a tight sliding fit on hub 60 free from any radial play. Milling cutter 3 is held on hub 60 against any axial play by means of plate 70 which is secured to hub 60 by screws 71. Thus, plate 70 co-operates with shoulder 65 and bearing face 66 to form a channel bearing in which annular bearing rib 68 slides with a tight accurate bearing fit. Milling cutter 3 projects beyond support plates 62, 63 a distance greater than its radius so that cutter 3 can cut to depths greater than its radius. Note axis 54 to left of plate 62 (Fig. 10). Bearing surfaces between hub 60 and milling cutter 67 are lubricated continuously during the operation of the milling cutter by lubricant under pressure. Each hub 60 and milling cutter ring 67 are made of high speed steel so that bearing surfaces 66 and 68 consist of high speed steel lubricated under pressure. The composition of these high speed steels is well known. High speed steels are alloys of carbon, tungsten, chromium, and vanadium and some of these high speed steels also contain molybdenum and cobalt. The carbon content of high speed steel usually runs from .55 to .90%, tungsten 12 to 21%, chromium 3.5 to 4.5%, vanadium .75 to 2.5%, cobalt 3 to 13%. Where molybdenum is used in ranges from 6 to 9%, then the tungsten content is usually lowered from 1 to 2½%.

When a pair of milling cutters 3 are used for straddle milling, then spacer block 75 is omitted and a second milling cutter assembly comprising a milling cutter 67, hub 60, and plate 70 is substituted therefor, as shown in Fig. 15. In this case the bolt 64 rigidly secures two hub assemblies 60, 70 between, and to, frame members 62, 63 so that the milling cutters 3 are concentrically positioned in spaced relation. The space 76 between the milling cutters 3 is equal to the width of the vanes 40.

In Fig. 16 there is shown a finishing cutter 80 provided with a cutting tip of hard cemented carbide. Tip 80 is mounted in a tooth 81 of a ring gear 82 which is supported upon fixed hub 83 by ball bearings 84. Gear 82 is driven by gear 46 the same as milling cutters 67. In the finishing operation the milling cutter 3 and its hub 60 are removed from the machine and hub 83 and milling cutter assembly substituted therefor. Hub 83 is secured to support member 62, 63 in the same manner as hub 60.

In the operation of the instant machine the work 19 is mounted on sleeve 18 as above described. Each vane is milled as follows: With bolt 27 loosened, crank 32 is turned to index plate 17 so that one hole 39 is aligned with center opening 14 of dowel plate 11, Fig. 5, and dowel pin 85 is inserted in holes 14 and 39 to lock plate 17 and work 19 in position, Fig. 5. With the work thus held in fixed position against rotation and with milling cutter 3 driven as above described, the work 19 is advanced toward the work by sliding head 10 along table 1 in a conventional manner. The milling cutter 3 cuts into work 19 to a depth beyond the center 54 of the milling cutter. The milling cutter 3 can cut to a depth greater than its radius because of the manner in which it is mounted upon hub 60 as above described.

Figure 5:
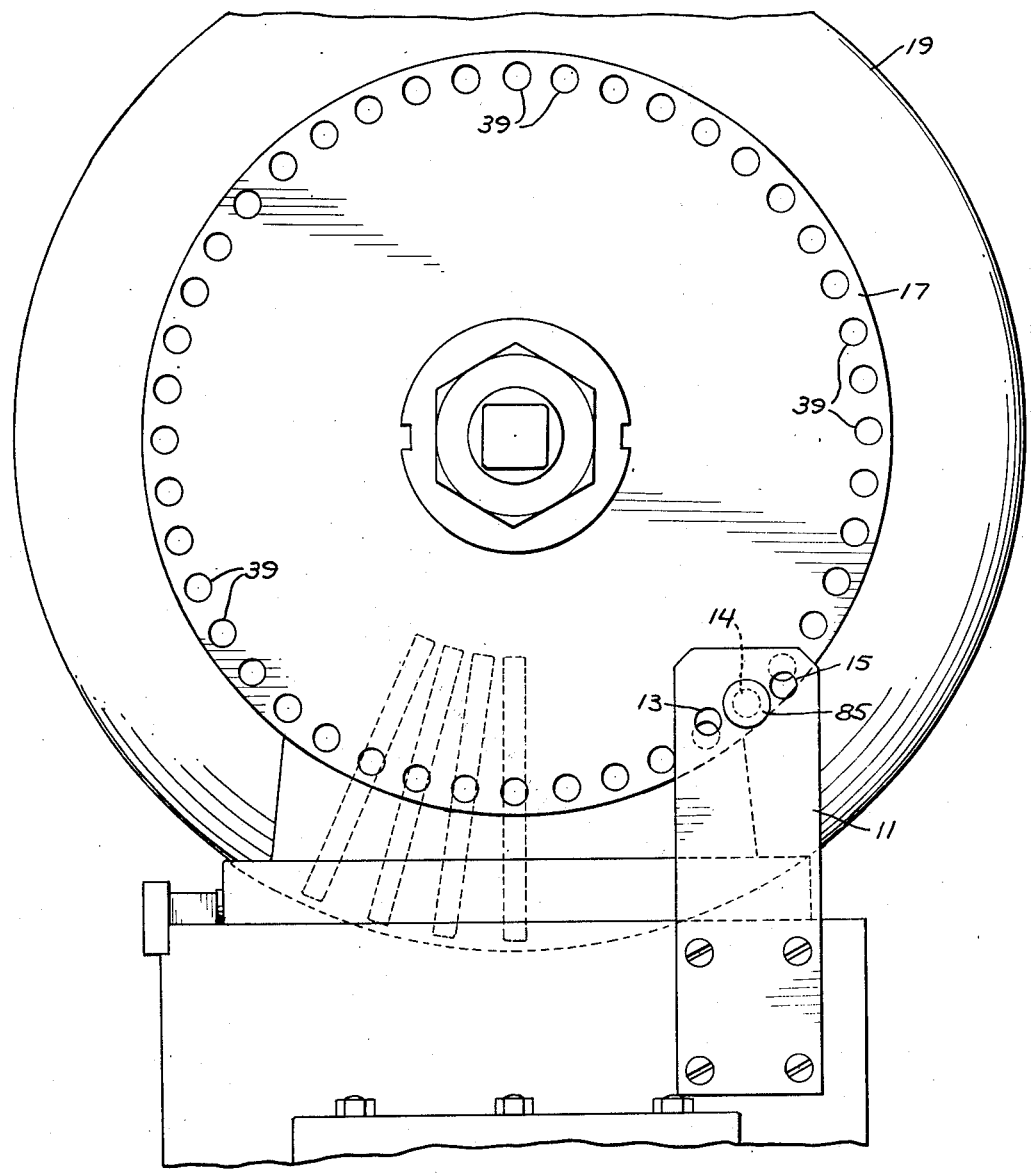
Fig. 5 is a rear elevational view of the indexing and dowel plates and the work and shows the first series of cuts in the work with a single milling cutter.
Figure 8:
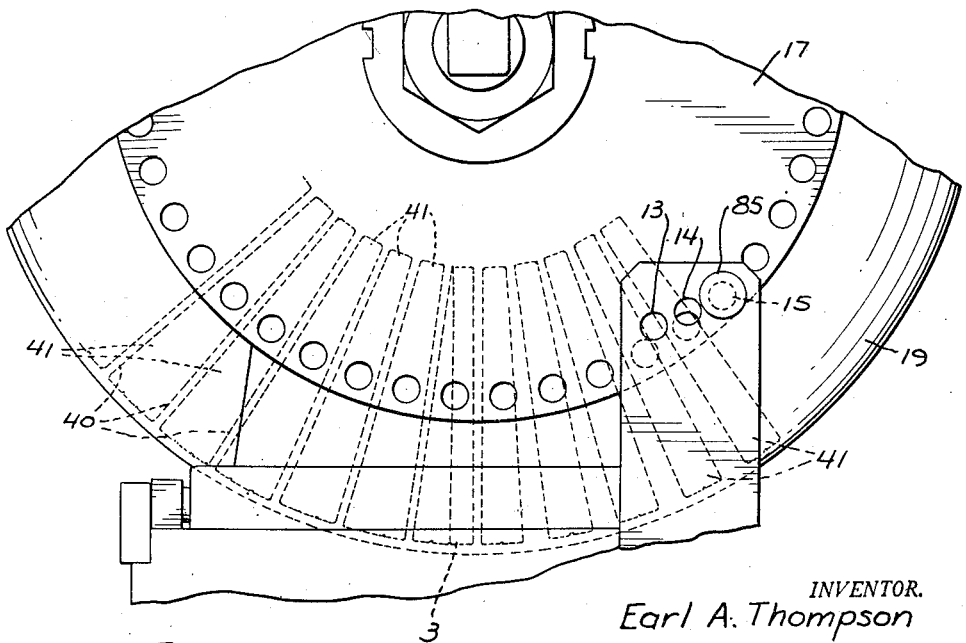
Fig. 8 is a view similar to Fig. 7 but showing the third and final series of cuts of a three cut system made with a single milling cutter.
Figure 9:
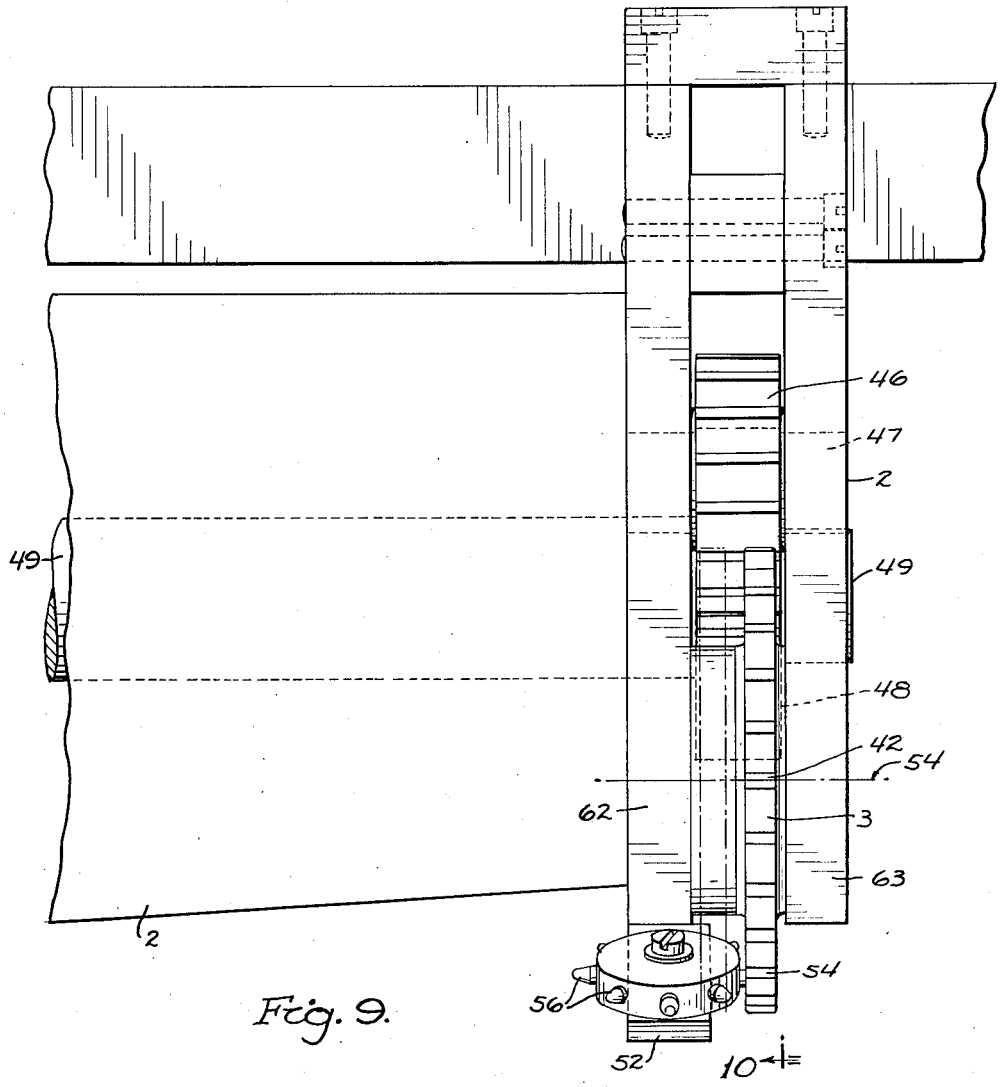
Fig. 9 is an enlarged detail elevation showing the milling cutter and chip breaker.

The first cut taken in work 19 is illustrated in Fig. 5. At the end of the first cutting operation there will be one cut for each opening 39 in the index plate 17. After the first series of cuts have been taken in the work 19, Fig. 5, then a second series of cuts, as illustrated in Fig. 7, are taken in the work 19. For this series of cuts dowel pin 85 is positioned in opening 13 of plate 11. For the third and final series of cuts the dowel pin 85 is shifted to opening 15, Fig. 8. After the first series of cuts are made in the work 19, Fig. 5, the milling cutter 3 cuts into the left hand side wall of each initial cut, as shown in Fig. 7, and in the third and final cut the milling cutter 3 cuts into the right hand wall of the initial cut thus producing the vanes 40 which are substantially cut to finished size. However, for finish cutting the vanes 40 to size, rotary tool 80, Fig. 16, is used.

Figure 6:
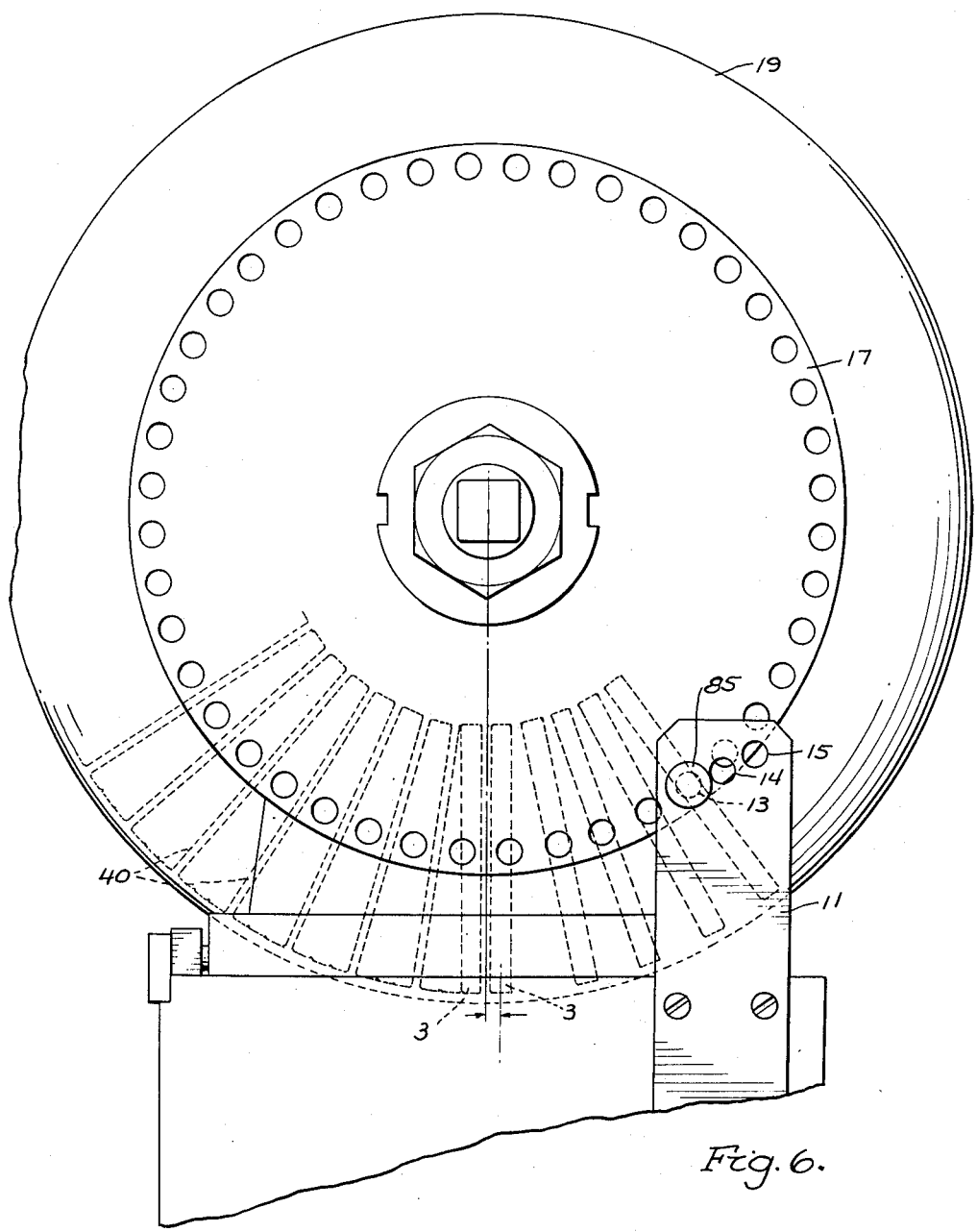
Fig. 6 is a view similar to Fig. 5 showing the second and final series of cuts made with a straddle mill.

If it is desired to form each vane with but two cuts, then after the first cut is made, Fig. 5, the straddle milling cutter, Fig. 15, is used. The straddle mill straddles and cuts the unfinished vane resulting from the first cut, Fig. 5, to its finished size, Fig. 6. During the straddle milling operation dowel pin 85 is positioned in opening 13 of dowel plate 11 for each of the straddle milling operations.

I claim:
1. In a milling machine, a support, a disc-shaped hub arranged on said support with a portion of said hub overlapping said support and with the remaining portion of said hub projecting outwardly beyond the periphery of said support, means fixedly connecting said overlapping portion of said hub with the adjacent portion of said support, a milling cutter in the form of an annulus journalled on said disc-shaped hub, the portion of said disc-shaped hub projecting outwardly beyond the periphery of said support having a thickness no greater than the width of said milling cutter whereby said milling cutter is capable of milling to a depth equal to the distance between the outermost portion of said cutter and the periphery of said support, the axial center of said disc-shaped hub being disposed on that portion of the sub which projects outwardly beyond the periphery of said support.

2. The combination called for in claim 1 wherein the outer periphery of said disc-shaped hub and the inner periphery of said cutter provide cylindrical bearing surfaces.

3. The combination defined in claim 1 wherein the outer periphery of said disc-shaped hub and the inner periphery of said cutter are provided with inter-engaged shoulders and means lying within the plane of said cutter for maintaining said shoulders interengaged whereby to prevent said cutter from shifting laterally on said hub.

4. The combination defined in claim 3 wherein said cutter is provided around its outer circumference with a plurality of radially extending teeth, each tooth being provided with a front cutting edge and face and a rear driving face and including a gear mounted on said support and having teeth thereon which intermesh with said rear driving faces of said teeth for driving said cutter.

5. In a milling machine, a frame, a pair of support plates fixed on said frame in spaced apart relation, a hub member positioned between said support plates, means passing through said support plates and said hub member and fixedly mounting said hub member between said support plates, said hub member comprising a disc, the outer periphery of which forms a cylindrical bearing surface, said disc being mounted between said support plates such that a portion of said cylindrical surface is disposed within the confines of the periphery of said support plates and another portion of said cylindrical bearing surface is disposed beyond the periphery of said support plates, a milling cutter in the form of an annulus having cutting teeth spaced around its outer periphery, the inner periphery of said annulus comprising a cylindrical bearing surface, said cutter being journalled for rotation on said cylindrical bearing surface of said disc, the portion of said disc projecting beyond the periphery of said support plates having a thickness no greater than the thickness of said cutter, whereby said milling cutter is capable of milling to a depth equal to the distance between the outermost portion of the cutter and the periphery of said support plates.

6. The combination defined in claim 5 wherein the axial center of said disc-shaped hub is positioned outside the periphery of said support plates whereby said milling cutter is capable of milling to a depth greater than the radius of said cutter.

References Cited in the file of this patent
UNITED STATES PATENTS

| Number | Name | Date |
|---|---|---|
| 417,093 | Robison | Dec. 10, 1889 |
| 599,680 | Booth et al. | Mar. 1, 1898 |
| 662,749 | Arthur | Nov. 27, 1900 |
| 1,029,208 | Melling | June 11, 1912 |
| 1,085,252 | Gorton | Jan. 27, 1914 |
| 1,321,881 | Birchland et al. | Nov. 18, 1919 |
| 1,423,504 | Vernon | July 18, 1922 |
| 1,516,543 | Meier | Nov. 25, 1924 |
| 1,744,006 | Laws | Jan. 14, 1930 |
| 2,065,173 | Davis | Dec. 22, 1936 |
| 2,231,747 | Bauer | Feb. 11, 1941 |
| 2,286,633 | McCabe | June 16, 1942 |
| 2,389,201 | Lawrenz | Nov. 20, 1945 |
| 2,585,973 | Stieglitz | Feb. 19, 1952 |

FOREIGN PATENTS

| Number | Country | Date |
|---|---|---|
| 530,539 | Great Britain | Dec. 13, 1940 |